Figure 1:
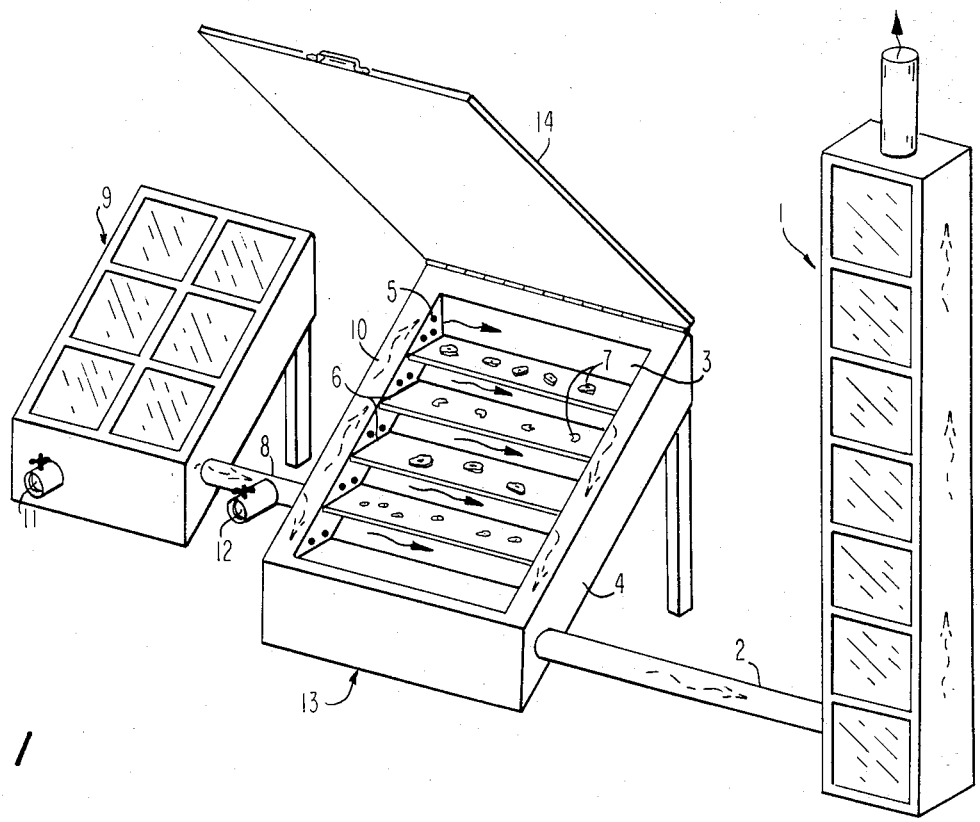

United States Patent [19]
O'Hare

[11] Patent Number: 4,501,074
[45] Date of Patent: Feb. 26, 1985

[54] CONVECTION POWERED SOLAR FOOD DRYER

[76] Inventor: Louis R. O'Hare, 1041 Ponderosa, Apt. 2, Fort Collins, Colo. 80521

[21] Appl. No.: 234,970

[22] Filed: Feb. 17, 1981

[51] Int. Cl.$^3$ .............................................. F26B 9/06
[52] U.S. Cl. ........................................ 34/93; 126/417
[58] Field of Search ...................... 126/417, 429, 430; 34/93

[56] References Cited
U.S. PATENT DOCUMENTS
  430,762  6/1890  Taylor .
4,085,667  4/1978  Christianson ...................... 126/417

FOREIGN PATENT DOCUMENTS
2836526  3/1979  Fed. Rep. of Germany .......... 34/93

Primary Examiner—Larry I. Schwartz

[57] ABSTRACT

A solar powered food dryer that may be used indoors is provided when a solar heated convection column is used to produce a draft of air and by means of this draft to draw air from a solar collector through a food drying chamber in such a way that the hot air from the collector is drawn over the food in the drying chamber and hot air ducting of the airstream provides a means of remoting the drying chamber to a sanitary and convenient place while leaving both the air heater and the draft generating convection column in a place exposed to solar radiation.

2 Claims, 2 Drawing Figures

U.S. Patent Feb. 26, 1985 4,501,074

CONVECTION POWERED SOLAR FOOD DRYER

This invention is a type of food dryer that uses solar energy to dry food in order to preserve it. While the concept of using the suns rays to dry food is probably as old as mankind, and while the same is most likely true of the drying of food by the circulation of air around the foodstuff such as by the hanging of fish on racks in the wind to dry, nevertheless the object of this invention is to keep the advantages of the ancient practice and to improve upon them. The advantage of a dryer powered only be solar energy is obvious in an energy needy world. The object of improving this art is to provide a more sanitary and convenient way of drying food with solar energy. Enclosing the food to remove it from contact with insects and dust is one obvious solution and glass enclosed dryers placed in the sun is a well used means of achieving this objective. Some glass enclosed drying racks used in the current art provide openings at the top and bottom through which convecting air currents can draw off evaporating moisture as well as moderate the temperature build up within the drying chamber.

Important as these improvements are seen to be, this present invention greatly increases the flow of air without resorting to electrically powered blowers and, with the increased solar powered air flow, it greatly increases the heat that may be applied in a given time in order to increase drying rates. My present invention is a more efficient heater not only by increasing drying rates but also by providing a more efficient solar-to-heat converter. This is true because while the sunlight impinging the drying food through the glass of current dryers is indeed converted to heat nevertheless the use of a selective surface black body converter in the place of the food itself to perform the energy conversion is a more effective way of getting the most heat from a given incidence of sunlight. Furthermore, instead of opening and closing a current collector-dryer in which collecting and drying are combined in one unit and must be filled and emptied and cleaned out of doors in the sun, this present invention provides the convenience of a sanitary indoor operation since the heat converter may be remoted from the dryer. In those instances in which this present invention is applied to commercial operation to reduce large scale heating costs, the invention provides the advantage of easy convertability to other power sources for heating. Electric or gas heated air is ducted to the drying chamber by a simple valving action in the place of the air from the solar heater on rainy days. An electric blower similarly is used to provide the draft that would otherwise be provided by the convection column. This feature of easy convertability to an alternate embodiment is an advantage over former art in that it provides for a use of the dryer element which conventional solar dryers do not provide, namely its use for drying periods of low solar incidence. Food drying can go on and spoilage prevented during rainy periods but without the solar energy advantage in that case. This invention makes indoor, completely passive solar food drying possible without making it necessary to depend entirely on solar to accomplish food drying because it is adaptable to other sources of heat.

This present invention also resembles other current art in U.S. Pat. No. 4,253,801 called, "Series Convection Pump" in which heating to provide convection energy is accomplished in a separate structure from the structure that provides the heat used for heat transfer. In that former patent a series of hot and cooled columns are used to accumulate pressure to force air into a solar collector or into a heat storage unit etc. This present invention uses a simple, single column to draw air from a heated source and over material to be dryed. Both inventions enable solar-produced airflow to act at a distance from the incident solar energy by providing an airstream that may be ducted but in the case of this invention the air is used for drying and it is drawn by a draft over the objects to be dried. The use of the convection column draft provides the advantage of other options of location in that, when the column is constructed sufficiently high to provide a sufficiently energetic draft, then both heater and column can be located above the drying chamber. Drying can be done in a building with the energy-converting equipment on the roof. This use of a convection column to draw air that is heated by a separate heater corresponds to similar usage in my copending applications with Ser. Nos. 198,359 now U.S. Pat. No. 4,441,067 and 184,205 now U.S. Pat. No. 4,453,382. In these applications the same type of draft from a convection column is in one instance used to draw both hot and then cooled air across mechanisms which depend on temperature variation for operation. In the present application drying air whether hot or cooled is moved by solar powered convection. As far as is known cool-air-drying, which is particularly suited to flavor enhancement as in the case of drying fish, is not achieved by other solar dryers but in an embodiment of the concept of this present invention the solar powered convection column is configured to draw cool air from a cool source such as a heat sink in the ground and circulate it over drying food in a drying chamber.

Other advantages and embodiments as well as clarification are seen by referring to the drawings.

FIG. 1 of the drawings shows a convection powered drying system in which the draft from a solar heated convection column draws air over food being dried. And the air that is drawn over the food is heated by a conventional black box solar air heater.

Figure 2:
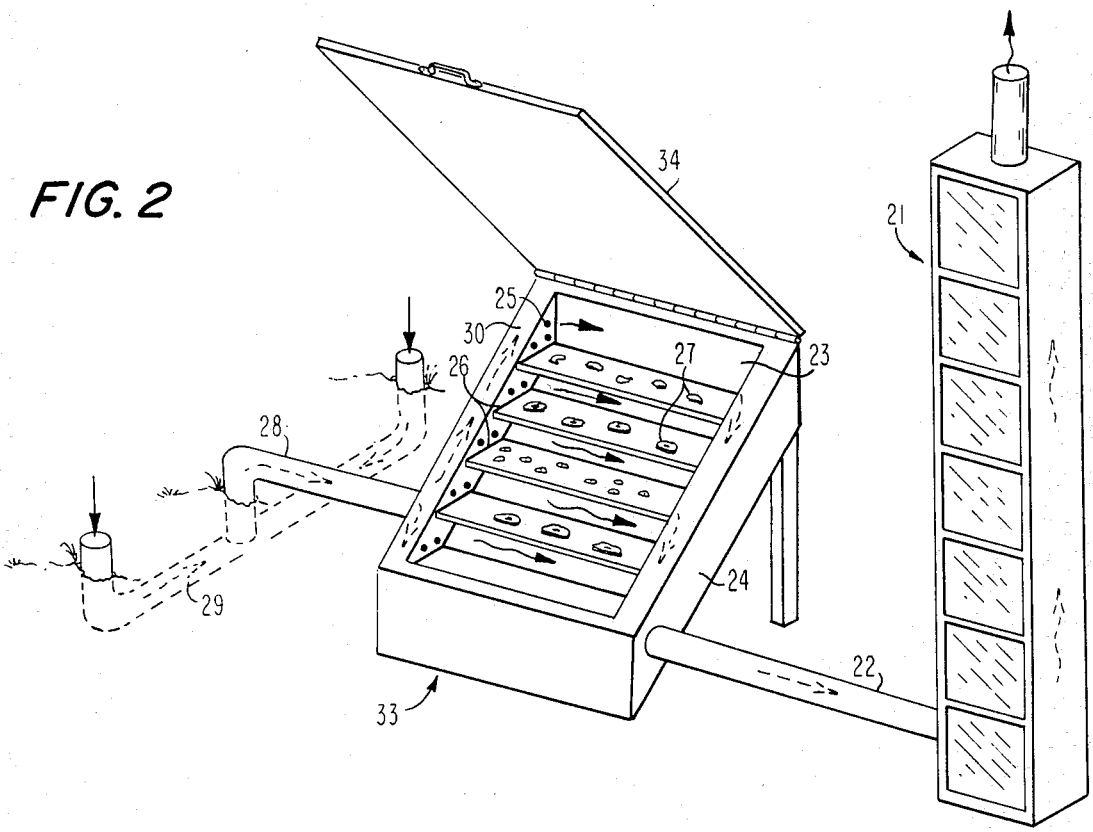

FIG. 2 of the drawings shows a convection powered drying system in which the draft from a solar heated convection column draws cool air over food in an enclosed drying chamber.

Referring then to FIG. 1 of the drawings, the solar heated convection column 1 is a solar black box collector of the type used for heating air and is in the form of a long rectangular box with its length disposed vertically. This column 1 is used to produce a draft of air. The draft is produced by means of low pressure formed at the bottom of the column when the air in the column is heated by the sun and tends to rise because of its expansion and loss of density. The draft moving up column 1 draws air through duct 2 which for convenience is shown as a short section of ducting but 2 is diagramatic and generalized and is meant to represent any practical length of duct to direct an airflow into 1 from drying chamber 3 through plenum 4. The action of this draft causes the low pressure developed in the base of 1 to be extended through 2 and into 3 when door 4 is closed down over chamber 3 sealing it except for fluid flow communication holes 5 on either side of drying shelves 6 which contain particles of drying food 7 over which the heated air is circulating. Because of the low internal pressure of 3, the air heated in conventional black box collector 9 is drawn to plenum 10 and chamber 3 through duct 8 for circulation over food 7 and for exit out 4 through 2 and into 1. The heated air that is drawn from 9 is replaced by ambient air entering induction valve 11 which controls flow rate through the system. The temperature of streaming air is controled by the use of valve 12 which is opened to various degrees to admit some ambient air and prevent excessive temperature elevation within the drying chamber during periods of abnormally high solar incidence or for the drying of some foods which is best accomplished by a somewhat cooler airflow. As in the case with duct 2, the duct 8 is pictured as being short in length, but its length is optional and depends upon the distance that the drying box 13 is removed from the collector and the convection column. The lid 4 is shown in the open position which is used for inserting food to be dried and for removing dried food from the shelves 6 which may be made of wood or wire mesh or perforated metal or plastic. The airflow around the food on the shelves as well as the uniform distribution of the flow is assured by the plenum 10 on the upstream side of the flow through the drying box and by plenum 4 on the downstream side of the flow through the box. These plenums 4 and 10 both have air diffusing holes 5 to enable an approximately equal distribution of air moving across each shelf. However, the assignment of either the right or left side as the upstream or downstream side is a matter of obvious choice as is the selection of either the top or bottom, front or back as long as diffusely streaming air circulates through the drying chamber. Likewise the entrance and exit ducts 8 and 2 may connect to plenums 10 and 4 at any position on its appropriate plenum as long as the upstream plenum is receiving air from the heat collector and the downstream plenum is exiting air into the convection column.

Referring then to FIG. 2, The column 21 corresponds to 1 of FIG. 1 and duct 22 of this FIG. 2 corresponds to 2 of FIG. 1. The plenums 30 and 24 of this FIG. 2 correspond respectively to plenums 10 and 4 of FIG. 1. The shelves 26 and the food 27 here in FIG. 2 correspond respectively to the shelves 6 and food 7 of FIG. 1. The air diffusion holes 25 of FIG. 2 serve the same purpose as 5 of FIG. 1 and lid 34 of FIG. 2 rotates downward to close drying chamber 23 just as 14 does to close 3 in FIG. 1. However, in this FIG. 2 the entrance duct 28 brings cool drying air from cooler pipe 29 into 23 via plenum 30 and diffusing holes 25. The cooling pipe 29 serves a plurality of purposes. It is used to remove moisture from the air that is to be used for drying because it is located in a cool place such as in a cool area of the earth or in a body of water and the moisture in the air condenses in the pipe to be drained off while the air is drawn over some foods that are more advantageously dried by cool air than by hot air.

In another embodiment cooling pipe 29 of FIG. 2 by means of duct 28 is connected to the inlet port 11 of collector of 9 in FIG. 1 in order that air deprived of some moisture might be subsequently heated and then used for drying as described in FIG. 1. In FIG. 2 the entire drying box may be remotely located from the solar convection tower and from the cooler.

I claim:
1. A solar powered food dryer comprising;
(1) a draft producing means in the form of a black box solar collector that is long and rectangular in shape with its length disposed vertically to provide a solar activated convection column, said draft production means having an opening at the top and a duct attached at the bottom and said duct being in fluidflow communication between the internal cavity of said convection column and,
(2) an air dryer means in the form of a compartment the walls of which support shelves for holding foodstuffs to be dryer and said compartment having a door and having sides surmounted by a plurality of plenum chambers in fluidflow communication with the drying compartment by means of small holes in the compartment and plenum walls, said plurality of plenums being comprised of essentially two plenums, one plenum being in upstream fluidflow communication with the drying compartment and the other in downstream communication and situated on another side of the compartment in such a way that air leaving the upstream plenum will diffuse approximately evenly through the drying chamber to this downstream plenum and said downstream plenum being in fluidflow relationship with the convection column duct to direct the convection-produced draft into the dryer compartment and said upstream plenum being in fluidflow communication by means of ducting to
(3) a solar air heating and temperature regulating means in the form of a black box solar collector with an air inlet valve attached to an air inlet port and said heating collector having an exit port connected to ducting which is in fluidflow communication both with the air dryer means and with a valve opening to ambient air.
2. A solar powered food dryer comprising;
(1) a draft producing means in the form of a black box solar collector that is long and rectangular in shape with its length disposed vertically to provide a solar activated convection column, said draft production means having an opening at the top and a duct attached at the bottom and said duct being in fluidflow communication between the internal cavity of said convection column and,
(2) an air dryer means in the form of a compartment the walls of which support shelves for holding foodstuffs to be dryer and said compartment having a door and having sides surmounted by a plurality of plenum chambers in fluidflow communication with the drying compartment by means of small holes in the compartment and plenum walls, said plurality of plenums being comprised of essentially two plenums, one plenum being in upstream fluidflow communication with the drying compartment and the other in downstream communication and situated on another side of the compartment in such a way that air leaving the upstream plenum will diffuse approximately evenly through the drying chamber to this downstream plenum and said downstream plenum being in fluidflow relationship with the convection column duct to direct the convection-produced draft into the dryer compartment and said upstream plenum being in fluidflow communication by means of ducting to
(3) an air cooling and drying means in the form of a heat transferring pipe located in a cool place and said cooling pipe having air inlet ports opening into ambient air and an exit port connected to ducting in fluid flow communication with air dryer means.

* * * * *